(12) United States Patent
Kampf et al.

(10) Patent No.: US 6,470,960 B2
(45) Date of Patent: Oct. 29, 2002

(54) AIR-CONDITIONING SYSTEM FOR A COMMERCIAL VEHICLE

(75) Inventors: Hans Kampf, Korb; Dietrich Klingler, Heubach; Dieter Schmadl, Marbach, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/838,274

(22) Filed: Apr. 20, 2001

(65) Prior Publication Data

US 2001/0032476 A1 Oct. 25, 2001

(30) Foreign Application Priority Data

Apr. 20, 2000 (DE) .......................................... 100 19 571

(51) Int. Cl.7 ................................................. B60H 1/32
(52) U.S. Cl. ............................ 165/42; 62/244; 454/121
(58) Field of Search ............................... 62/244; 165/42, 165/43; 237/12.3 A; 454/121

(56) References Cited

U.S. PATENT DOCUMENTS

| | | | | |
|---|---|---|---|---|
| 3,984,224 A | * | 10/1976 | Dawkins ....................... 62/236 |
| 4,280,330 A | * | 7/1981 | Harris et al. ............. 123/198 R |
| 4,586,652 A | * | 5/1986 | Sakurai ....................... 165/202 |
| 4,873,837 A | * | 10/1989 | Murray ........................ 137/528 |
| 5,301,515 A | * | 4/1994 | Iritani et al. ................ 454/121 |
| 5,934,092 A | | 8/1999 | Krompass et al. ............ 62/199 |
| 5,975,191 A | * | 11/1999 | Ohashi et al. ................ 165/43 |
| 6,079,485 A | * | 6/2000 | Esaki et al. ................... 165/42 |
| 6,101,830 A | * | 8/2000 | Feuerecker .................. 62/244 |
| 6,112,543 A | | 9/2000 | Feuerecker et al. ........... 62/430 |

FOREIGN PATENT DOCUMENTS

| | | |
|---|---|---|
| DE | 42 13 510 | 8/1993 |
| DE | 196 25 927 | 1/1998 |
| DE | 196 29 972 | 1/1998 |
| DE | 196 45 178 | 5/1998 |
| DE | 196 46 123 | 5/1998 |
| DE | 197 31 908 | 1/1999 |
| DE | 197 39 578 | 3/1999 |
| DE | 198 38 880 | 3/2000 |

* cited by examiner

*Primary Examiner*—William E. Tapolcai
(74) *Attorney, Agent, or Firm*—Foley & Lardner

(57) ABSTRACT

An air-conditioning system is disclosed for a cab of a commercial vehicle, which has a driver's area, a front-passenger's area and a sleeping area in the cab interior. The system is constructed as simply and cost-effectively as possible and permits more economical air-conditioning of the individual areas of the cab interior. The air-conditioning system has at least two fans (30, 32, 34) and a central control unit (16) that contains at least one heater and at least one cooling heat exchanger. Air temperature is controlled individually for each area and is guided via individual air ducts (20, 22, 24, 26, 28) into the respective areas. A first fan (30) is assigned to the drivers and front-passenger's area, and at least one second fan (32, 34) is assigned to the sleeping area.

21 Claims, 3 Drawing Sheets

AIR-CONDITIONING SYSTEM FOR A COMMERCIAL VEHICLE

BACKGROUND OF THE INVENTION

The invention relates to an air-conditioning system for a cab of a commercial vehicle. The air-conditioning system can supply individual areas of the cab interior with air and provides separate temperature control for controlling the temperature of the air supplied to each individual area. The invention further relates to the use of a multi-zone air-conditioning system with the individual temperature control for controlling the temperature of air supplied to individual areas of the interior of a commercial vehicle, e.g., a semi-tractor.

The cab of a relatively large commercial vehicle has a driver's area, a front-passenger's area and a sleeping area. In order to air condition these areas, air-conditioning systems are known which have a central control unit in the dashboard. The control unit controls the temperature of the air and supplies the air from the dashboard to, at least, the driver's and front-passenger's area via air ducts. The sleeping area is thereby air-conditioned at the same time. An auxiliary motor is provided to drive the compressor of the air-conditioning system as well as the fan for the parking air-conditioning system. The parking air-conditioning system functions whether or not the vehicle is moving and is desirable when sleeping overnight in the vehicle, particularly in hot climates. One disadvantage of this design is that the entire cab is cooled while the parking air-conditioning system is running.

DE 196 45 178 A1 discloses a commercial-vehicle air-conditioning system having, for a parking air-conditioning system, an ice storage device arranged in a rear wall of the sleeping area. This air-conditioning system is relatively complicated, since, in addition to the known control unit in the dashboard, it also has a second coolant circuit to which two further evaporators in the rear wall and in the roof are connected. Coolant lines are therefore laid essentially through the entire cab. These coolant lines can be associated with corresponding installation expenses and problems, such as the imperviousness of the lines to leaks etc.

Furthermore, air-conditioning systems have been developed for passenger vehicles. These systems have a central control unit which is arranged in the dashboard and in which at least one evaporator and one heating unit are arranged. A system of this type is disclosed, for example, in DE 197 39 578 A1. The air-conditioning system described therein has a downstream (air-side) temperature control. The space downstream of a heater, in which cold air which has bypassed the heater can be mixed with warm air, is divided into four air-mixing spaces which lie one next to another and are separated by partitions. The partitions extend beneath the heater and divide the cold-air bypass likewise into four sub-ducts. Via warm-air flaps, which are arranged directly downstream of the heater, and cold-air flaps, which close the cold-air bypasses, an individual temperature can be set in each mixing space irrespective of the temperatures in the other mixing spaces by mixing the cold air with the warm air according to desired levels. The air from the individual air-mixing spaces, in each of which the temperature is individually controlled, can be supplied via air ducts to the corresponding air-conditioning zones. In the process, the air is conveyed by a central fan, and the strength of the individual air streams is controlled by air flaps.

Accordingly, some objectives of the invention are to provide an improved air-conditioning system for a cab of a commercial vehicle, which is constructed as simply and cost-effectively as possible and which permits more economical air-conditioning of the individual areas of the cab interior. Another objective is to provide an improved method of air-conditioning the cab of a commercial vehicle.

SUMMARY OF THE INVENTION

In accomplishing the objects of the invention, there has been provided, according to one aspect of the invention, an air-conditioning system for a commercial vehicle cab, wherein the cab comprises in its interior a driver's area, a front passenger's area and a sleeping area, where the air-conditioning system comprises: (a) a central unit for separately controlling the temperature of air guided to be supplied to each interior area; (b) air ducts for guiding air from the central unit to each of the areas; and (c) a compressor in operable connection with the central unit, wherein the central unit comprises an air guiding housing including: (i) a first fan for directing air to the driver's and front passenger's areas via the air ducts; (ii) at least one second fan for directing air via the air ducts to the sleeping area; (ii) at least one heater in operable connection with the air ducts; and (iii) at least one cooling heat exchanger in operable connection with the air ducts.

According to another aspect of the present invention, there is provided a method for air-conditioning a commercial vehicle cab, wherein the cab comprises in its interior a driver's area, a front passenger's area and a sleeping area, the method comprising: (a) providing air ducts for guiding air to each of the areas; (b) providing a central unit for guiding air from the central assembly to each respective area via the air ducts and for controlling, independently the temperature of air guided to each area; (c) providing a first fan; (d) directing air with the first fan to the driver's and front passenger's areas via the air ducts; (e) providing at least one second fan; (f) directing air with the second fan to the sleeping area via the air ducts; (g) providing a heat exchanger in operable connection with the air ducts; (h) providing a cooling heat exchanger in operable connection with the air ducts; (i) providing refrigerant lines; and 0) providing a compressor in operable connection with the central assembly via the refrigerant lines.

Further objects, features and advantages of the invention will become apparent from the detailed description of preferred embodiments that follows, when considered together with the accompanying drawings.

BRIEF DESCRIPTION OF THE DRAWINGS

The invention is explained in detail below with reference to exemplary embodiments and with reference to the accompanying drawings, in which.

DETAILED DESCRIPTION OF THE PREFERRED EMBODIMENTS

Figure 1:
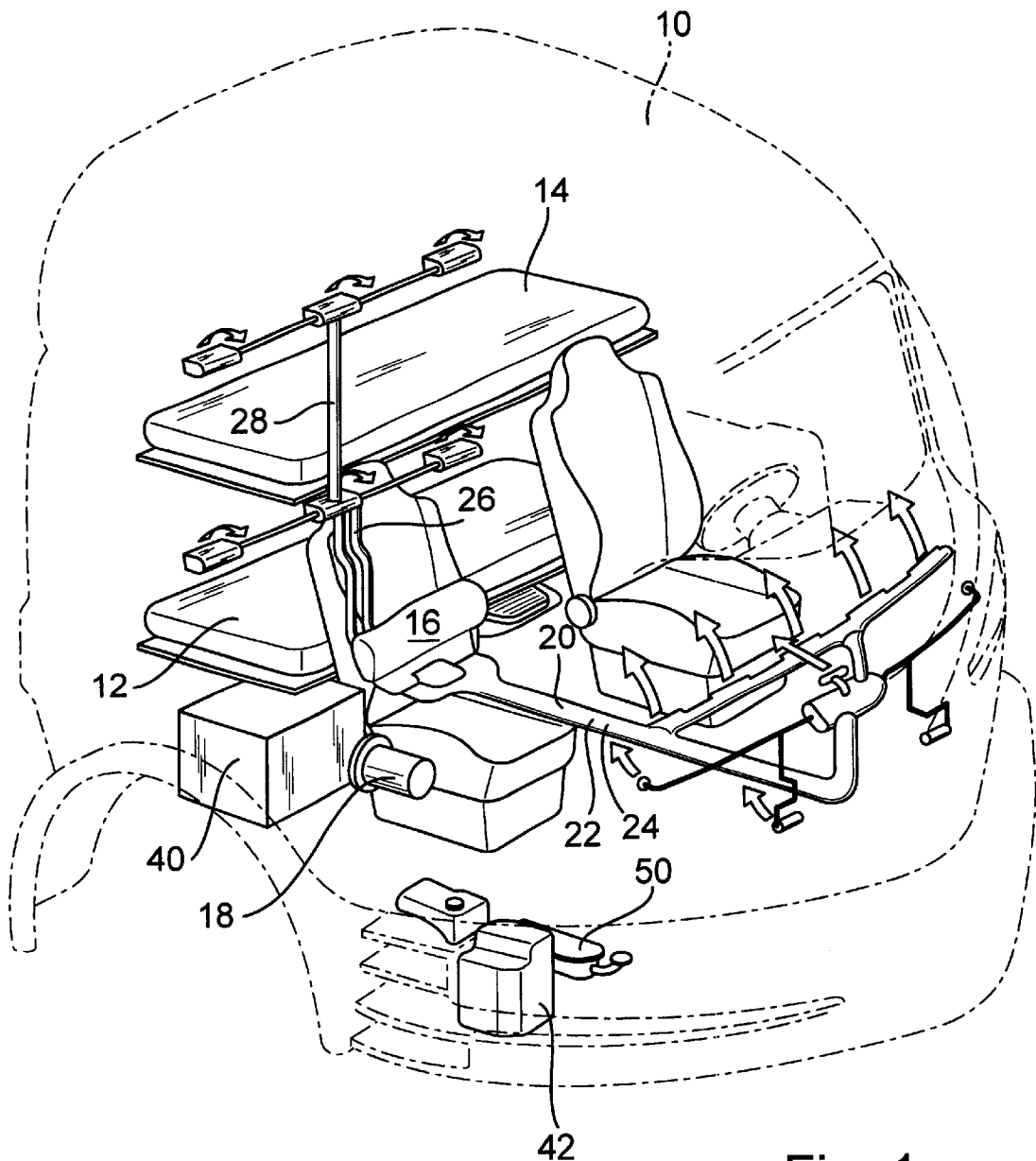
FIG. 1 depicts a cab of a commercial vehicle having an air-conditioning system according to the invention according to a first preferred exemplary embodiment.

The air-conditioning system according to the present invention has a central control unit in which the temperature of the air for each area, namely the driver's area, front-passenger's area and sleeping area, can be controlled individually. The air-conditioning system also provides individual air ducts for guiding air into the respective areas. Further, the air-conditioning system has at least two fans, including a first fan allocated for the driver's and front-passenger's areas and a second fan allocated for the sleeping area. Therefore, during a journey, the second fan may remain switched off while the first fan operates and supplies the driver's and front-passenger's areas with air-conditioned air. The second fan may merely be used when only the sleeping area has to be air conditioned, for example, at night if the sleeping area is occupied. Since there is less need for cooling at night, this second fan may be designed so that it is smaller, and therefore more cost-effective, and also quieter, so that the driver can rest, undisturbed, in the sleeping area.

The temperature of the air is controlled both in the day and at night, i.e., both for the sleeping area and for the driver's and front-passenger's areas, respectively in the central control unit.

This central control unit is preferably arranged under the bed, thereby providing space in the dashboard for other equipment, such as, for example, a navigation device, CD player, radio etc., or for storage compartments. The second fan can be designed so that it is even smaller and quieter, since the air for the sleeping area only has to be conveyed over short distances. The first fan is preferably designed so that it is somewhat more powerful than the second fan, which means that the first fan typically causes more noise than the second fan. This is not particularly disadvantageous, since, when the vehicle is moving and the driver's and front-passenger's areas are being air-conditioned, the noise of the fan from the control unit arranged in the sleeping area will not be noticed above other noises, such as engine noise, driving noises etc.

This arrangement has the further advantage that the air ducts which guide air into the driver's and front-passenger's areas can be arranged to pass through the cab floor, such that these ducts may also act as a floor heating system in cold seasons.

There are two preferred options, in particular, for the parking air-conditioning system. The first option is to provide an additional driving unit for driving the compressor of the air-conditioning system irrespective of whether or not the vehicle is moving or running. The second option is to provide a cold storage device, so that when the parking air-conditioning system is operated, only a fan, and optionally an electric pump, need be operated in order to convey the air via the cold storage device to the sleeping area. One possible design of an air-conditioning system of this type with a cold storage device is described, for example, in DE 198 38 880 (corresponding to U.S. Pat. No. 6,112,543), the disclosure of which is hereby incorporated by reference.

Turning now to the drawings, FIG. 1 shows a cab 10 of a commercial vehicle, having a driver's area, a front-passenger's area and a sleeping area arranged behind the driver's area and front-passenger's area. A lower bed 12 and preferably also an upper bed 14 are arranged in the sleeping area. The cab 10 can be air-conditioned by an air-conditioning system according to the present invention comprising a central control unit 16, a compressor 18, air-guiding ducts 20, 22, 24, 26, 28 and coolant/refrigerant lines, which are conventionally included, but have not been illustrated for the sake of clarity, between the central control unit 16 and the compressor 18.

The central control unit 16 has a first fan 30 and preferably second and third fans 32 and 34. The central control unit also has at least one cooling heat exchanger and at least one heater. The first, second and third fans, as well as the cooling heat exchanger and the heater are all arranged in a conventional air-guiding housing (not shown in detail). The central control unit 16 may be designed according to known principles, as discussed in the introduction to the specification above, for example, as disclosed in DE 196 46 123, DE 197 31 908 or DE 197 39 578. The temperature of the air for each of the areas can therefore be controlled individually in the central control unit 16, and the air can be supplied via the corresponding air ducts to the respective area. The central control unit 16 can preferably be used to air-condition a total of four areas, namely the driver's area, the front-passenger's area and the lower sleeping area and upper sleeping area.

Figure 2:
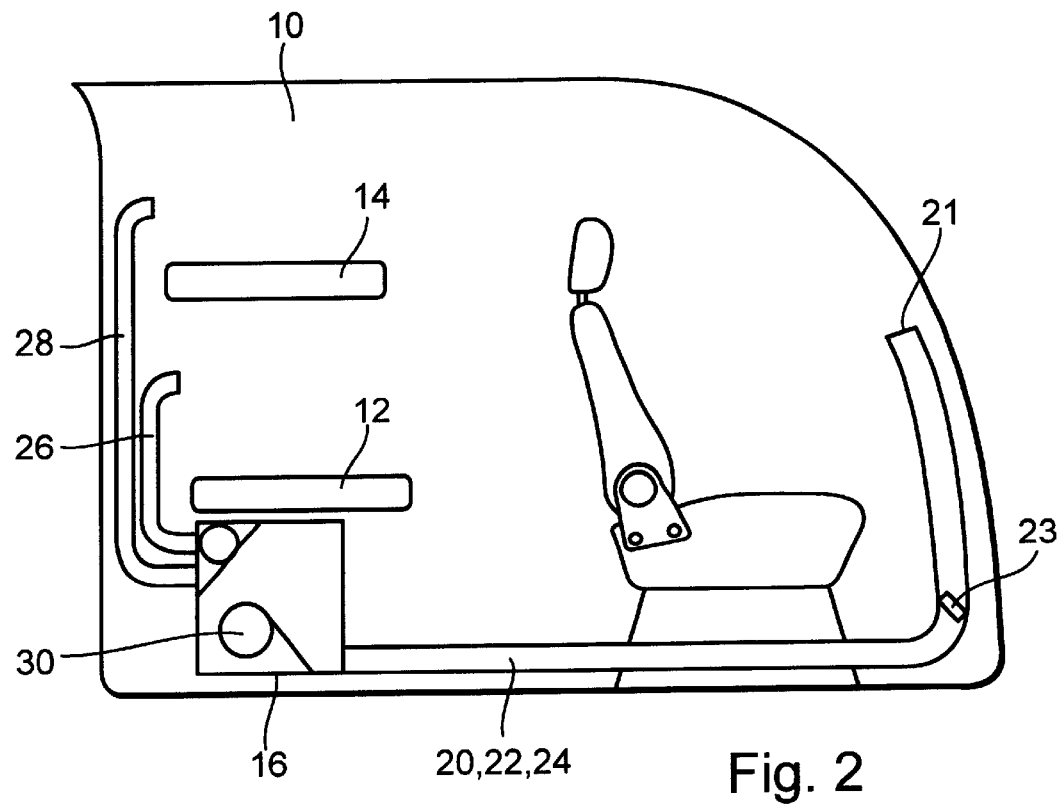
FIG. 2 shows a schematic illustration of part of the cab from FIG. 1 seen from the side.
Figure 3:
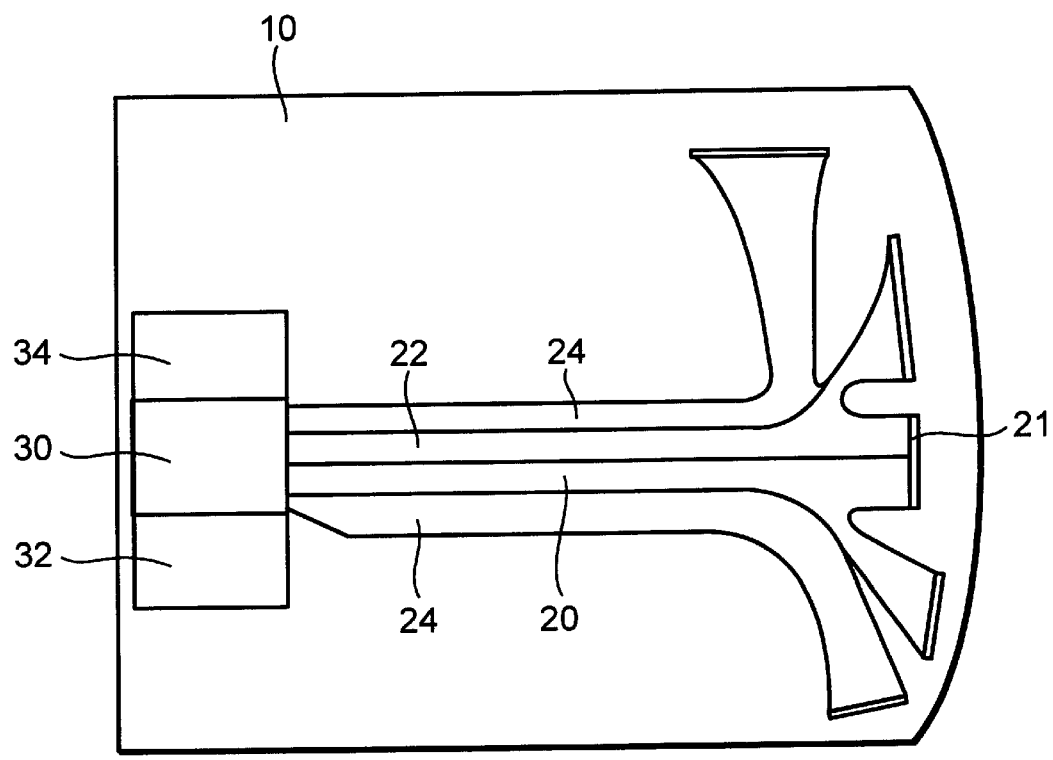
FIG. 3 shows a schematic illustration of part of the cab from FIG. 1 see from above.

As depicted in FIGS. 2 and 3, the central control unit 16 is preferably arranged under the lower bed 12. The first fan 30 is allocated to the driver's and front-passenger's areas (FIG. 3). The second fan 32 is assigned to the lower sleeping area, and the third fan 34 is assigned to the upper sleeping area. The individual fans can preferably be selectively activated individually, such that the appropriate fan can be operated depending on which area is occupied by a person.

Figure 4:
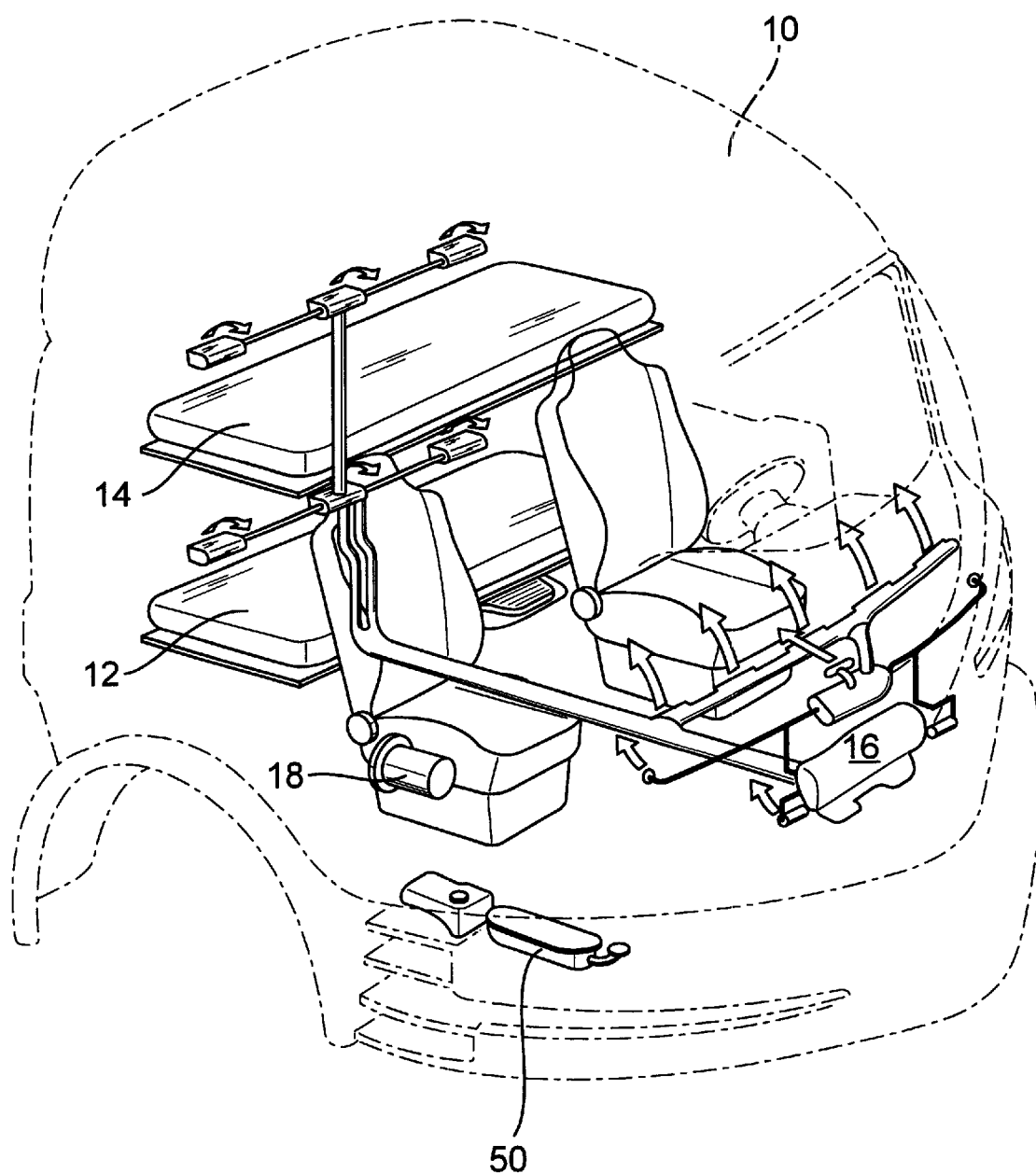
FIG. 4 depicts a further embodiment of the air-conditioning system according to the invention.

As shown in the embodiment of the invention illustrated in FIG. 4, the central control unit 16 can also be arranged in the dashboard area.

Preferably, the air-conditioning system further includes a system for enabling its operation regardless of whether or not the vehicle is moving or running, for example, a system to operate an air-conditioning system while the vehicle is parked. For this purpose, according to the first embodiment of the invention (FIG. 1), a cold storage unit 40 and a distributing unit 42 are provided. The cold storage unit 40 and the distributing unit 42 are connected to each other via cooling medium lines (which are not illustrated here for the sake of clarity) and are connected both to the compressor and to the central control unit 16 via cooling medium lines (which are also not illustrated here for the sake of clarity) or refrigerant lines. One possible design illustrating the interaction of the compressor, distributing unit, cold storage unit and central control unit with cooling and heating heat exchangers is described in detail in commonly-assigned DE 198 38 880 (corresponding to U.S. Pat. No. 6,112,543), which is hereby incorporated by reference in its entirety.

However, an alternative parking air-conditioning system is also contemplated in which the cold storage unit 40 and the distributing unit 42 can be dispensed with. Instead, an additional (auxiliary) driving unit can be provided for driving the compressor 18 of the air-conditioning system irrespective of whether or not the vehicle is moving or running.

Furthermore, a parking heating system 50 can be provided which interacts in a known manner (not illustrated in greater detail) with the heater of the central control unit 16.

If the central control unit is arranged under the bed area and the air has to be conveyed over a relatively long distance from the control unit 16 to the outlets in the cockpit region, it may be advantageous to provide at least one additional heating system, for example an electrical heating system 23, for secondary heating at least in one air duct 20, 22, and particularly in the air ducts 20, 22 which lead to defroster nozzles 21 arranged near the windshield (FIG. 2).

By means of the air-conditioning system according to the invention each area of the interior, namely, the driver's area, the front-passenger's area, the lower sleeping area and the upper sleeping area, can be temperature-controlled individually, both when the vehicle is moving or running and when it is parked. The temperature of the air for each region is controlled in the central control unit 16 which can be arranged centrally at any desired position in the cab, but preferably under the lower bed 12, i.e., in an area where space is available and no other appliances require space. The air-conditioning system according to the invention therefore not only permits the individual air-conditioning of four individual areas of the cab interior, but also the favorable positioning of the individual components of the air-conditioning system.

The disclosure of German Patent Application No. 100 19 571.7, filed Apr. 20, 2000 is hereby incorporated by reference in its entirety.

The foregoing embodiments have been shown and described for illustrative purposes only and are not intended to limit the scope of the invention which is defined by the claims. The invention includes all obvious modifications of the embodiments described above.

What is claimed is:

1. An air-conditioning system for a commercial vehicle cab, wherein the cab comprises in its interior a driver's area, a front passenger's area and a sleeping area, said air-conditioning system comprising:
    (a) a central unit for separately controlling the temperature of air guided to be supplied to each interior area;
    (b) air ducts for guiding air from said central unit to each of said areas; and
    (c) a compressor in operable connection with said central unit, wherein said central unit comprises an air guiding housing including:
        (i) a first fan for directing air to the driver's and front passenger's areas via said air ducts;
        (ii) at least one second fan for directing air via said air ducts to said sleeping area;
        (iii) at least one heater in operable connection with said air ducts; and
        (iv) at least one cooling heat exchanger in operable connection with said air ducts.

2. An air-conditioning system according to claim 1, wherein said central unit is positioned under said sleeping area.

3. An air-conditioning system according to claim 1, wherein said sleeping area comprises first and second separate beds and said at least one second fan directs air via said ducts to the first bed.

4. An air-conditioning system according to claim 3, wherein said central unit further comprises a third fan for directing air via said ducts to the second bed.

5. An air-conditioning system according to claim 1, further comprising a night cooling system for providing conditioned air via said at least one second fan to the sleeping area independently of whether the vehicle is in operation.

6. An air-conditioning system according to claim 5, wherein said night cooling system comprises an auxiliary driving unit for driving said compressor.

7. An air-conditioning system according to claim 5, wherein said night cooling system comprises a cold storage device in operable connection with said air ducts.

8. An air-conditioning system according to claim 1, further comprising an auxiliary heating system in operable connection with said air ducts for providing heated air via said air ducts independently of whether the vehicle is in operation.

9. An air-conditioning system according to claim 1, wherein at least one of said air ducts further comprises a defroster nozzle arranged to blow air onto a windshield of said cab, and wherein said air duct comprising defroster nozzles further comprises an electric heating element for selective operation to heat air in said air duct.

10. An air-conditioning system according to claim 2, wherein said sleeping area is located in a rear area of the vehicle cab and wherein said air ducts guiding air to said driver's area and said front passenger's area pass beneath the cab interior and terminate in front of said driver's and front passenger's areas.

11. A method for air-conditioning a commercial vehicle cab, wherein the cab comprises in its interior a driver's area, a front passenger's area and a sleeping area, said method comprising:
    (a) providing air ducts for guiding air to each of said areas;
    (b) providing a central unit for:
        (i) guiding air from said central assembly to each respective area via said air ducts; and
        (ii) controlling, independently the temperature of air guided to each area;
    (c) providing a first fan;
    (d) directing air with said first fan to the driver's and front passenger's areas via said air ducts;
    (e) providing at least one second fan;
    (f) directing air with said second fan to said sleeping area via said air ducts;
    (g) providing a heat exchanger in operable connection with said air ducts;
    (h) providing a cooling heat exchanger in operable connection with said air ducts;
    (i) providing refrigerant lines; and
    (j) providing a compressor in operable connection with said central assembly via said coolant lines.

12. A method according to claim 11, further comprising:
    (a) providing a heating system for heating independently of whether the vehicle is in operation, said heating system being in operable connection with said air ducts; and
    (b) providing air heated by said heating system via said air ducts.

13. A method according to claim 11, further comprising directing air with said second fan to a first of two sleeping areas via said air ducts.

14. A method according to claim 13, further comprising:
    (a) providing a third fan;
    (b) directing air with said third fan to a second of two sleeping areas via said air ducts.

15. A method according to claim 11, further comprising providing nozzles in operable connection with at least one air duct and arranged for blowing air onto a windshield of said cab.

16. A method according to claim 15, further comprising providing an electric heating system in operable connection with said air duct.

17. A method according to claim 11, further comprising providing a driving unit for driving said compressor independently of whether said vehicle is in operation.

18. A method according to claim 11, further comprising providing a cold storage device in operable connection with said air ducts for cooling air independently of whether the vehicle is in operation.

19. An air-conditioning system according to claim 11, wherein said second fan has a smaller capacity than said first fan.

20. An air-conditioning system for a commercial vehicle cab, wherein the cab comprises in its interior a driver's area, a front passenger's area and a sleeping area wherein said sleeping area comprises a first bed and a second bed and wherein said sleeping area is located in a rear area of the vehicle cab, said air-conditioning system comprising:

(a) a central unit positioned under said sleeping area for separately controlling the temperature of air guided to be supplied to each interior area;

(b) air ducts for guiding air from said central unit to each of said areas wherein air ducts guiding air to said driver's area and said front passenger's area pass beneath the cab interior and terminate in front of said driver's and front passenger's areas and wherein at least one of said air ducts further comprises a defroster nozzle arranged to blow air onto a windshield of said cab, and wherein said air duct comprising defroster nozzles further comprises an electric heating element for selective operation to heat air in said air duct; and (c) a compressor in operable connection with said central unit, wherein said central unit comprises an air guiding housing including:
  (i) a first fan for directing air to the driver's and front passenger's areas via said air ducts;
  (ii) at least one second fan for directing air via said air ducts to said first bed;
  (iii) at least one third fan for directing air via said air ducts to said second bed;
  (iv) at least one heater in operable connection with said air ducts; and
  (v) at least one cooling heat exchanger in operable connection with said air ducts;

(d) a night cooling system for providing conditioned air via said at leas t one second fan to the sleeping area independently of whether the vehicle is in operation wherein said night cooling system comprises:
  (i) an auxiliary driving unit for driving said compressor; and
  (ii) a cold storage device in operable connect ion with said air ducts;

(e) an auxiliary heating system in operable connection with said air ducts for providing heated air via said air ducts independently of whether the vehicle is in operation.

21. A method for air-conditioning a commercial vehicle cab, wherein the cab comprises in its interior a driver's area, a front passenger's area and a sleeping area, said method comprising:

(a) providing air ducts for guiding air to each of said areas;

(b) providing a central unit for:
  (i) guiding air from said central assembly to each respective area via said air ducts; and
  (ii) controlling, independently the temperature of air guided to each area;

(c) providing a first fan;

(d) directing air with said first fan to the driver's and front passenger's areas via said air ducts;

(e) providing at least one second fan, wherein said second fan has a smaller capacity than said first fan;

(f) directing air with said second fan to said sleeping area via said air ducts;

(g) providing a heat exchanger in operable connection with said air ducts;

(h) providing a cooling heat exchanger in operable connection with said air ducts;

(i) providing refrigerant lines;

(j) providing a compressor in operable connection with said central assembly via said coolant lines;

(k) providing a heating system for heating independently of whether the vehicle is in operation, said heating system being in operable connection with said air ducts;

(l) providing air heated by said heating system via said air ducts.

(m) directing air with said second fan to a first of two sleeping areas via said air ducts.

(n) providing a third fan;

(o) directing air with said third fan to a second of two sleeping areas via said air ducts;

(p) providing nozzles in operable connection with at least one air duct and arranged for blowing air onto a windshield of said cab;

(q) providing an electric heating system in operable connection with said air duct;

(r) providing a driving unit for driving said compressor independently of whether said vehicle is in operation;

(s) providing a cold storage device in operable connection with said air ducts for cooling air independently of whether the vehicle is in operation.

* * * * *